United States Patent
Jeon

(10) Patent No.: US 9,574,800 B2
(45) Date of Patent: Feb. 21, 2017

(54) ABSORPTION REFRIGERATION SYSTEM

(71) Applicant: Dongbu Daewoo Electronics Corporation, Seoul (KR)

(72) Inventor: Yong Deok Jeon, Seoul (KR)

(73) Assignee: DONGBU DAEWOO ELECTRONICS CORPORATION, Seoul (KR)

( * ) Notice: Subject to any disclaimer, the term of this patent is extended or adjusted under 35 U.S.C. 154(b) by 544 days.

(21) Appl. No.: 14/183,173

(22) Filed: Feb. 18, 2014

(65) Prior Publication Data
US 2015/0184899 A1    Jul. 2, 2015

(30) Foreign Application Priority Data
Dec. 26, 2013   (KR) .................. 10-2013-0163908

(51) Int. Cl.
F25B 15/06    (2006.01)
F25B 15/02    (2006.01)
(Continued)

(52) U.S. Cl.
CPC .............. *F25B 15/06* (2013.01); *D06F 39/00* (2013.01); *F25B 15/02* (2013.01); *F25B 29/006* (2013.01); *F25B 2339/047* (2013.01); *Y02B 30/62* (2013.01)

(58) Field of Classification Search
CPC ......... F25B 15/06; F25B 29/006; F25B 15/02; D06F 39/00
See application file for complete search history.

(56) References Cited

U.S. PATENT DOCUMENTS 4,070,870 A    1/1978    Bahel et al.
4,152,901 A  *  5/1979    Munters .............. B01D 61/022
                                                             62/112
(Continued)

FOREIGN PATENT DOCUMENTS

JP    2004-286327    10/2004
JP    2009-160250    7/2009
(Continued)

OTHER PUBLICATIONS

Korean Office Action dated Apr. 9, 2015 issued in corresponding Korean patent application No. 10-2013-0163908.
(Continued)

*Primary Examiner* — Emmanuel Duke

(57) ABSTRACT

An absorption refrigeration system can include: an evaporator configured to evaporate a first refrigerant; an absorber configured to contain an absorbent solution and absorb the evaporated first refrigerant; a regenerator configured to regenerate the absorbent solution by heating the absorbent solution supplied from the absorber; a condenser configured to condense the first refrigerant evaporated in the regenerator; a cooler configured to circulate a second refrigerant inside the evaporator, where the second refrigerant is cooled in the evaporator by evaporation of the first refrigerant; a hot water storage tank configured to store hot water that is heated by absorbing heat from the absorber and the condenser; one or more hot water consumption units configured to receive the hot water from the hot water storage tank; and one or more cold air consumption units configured to receive cooled second refrigerant from the evaporator via the cooler.

15 Claims, 1 Drawing Sheet

(51) Int. Cl.
F25B 29/00 (2006.01)
D06F 39/00 (2006.01)

(56) References Cited

U.S. PATENT DOCUMENTS

| | | | | |
|---|---|---|---|---|
| 4,672,821 A | * | 6/1987 | Furutera | F25B 15/06 |
| | | | | 62/238.3 |
| 5,282,369 A | | 2/1994 | Ohuchi et al. | |
| 6,047,559 A | | 4/2000 | Tanaka et al. | |
| 9,016,084 B2 | * | 4/2015 | Alden | F25B 27/00 |
| | | | | 62/402 |
| 2013/0319028 A1 | * | 12/2013 | Tsubouchi | F25B 30/04 |
| | | | | 62/238.3 |

FOREIGN PATENT DOCUMENTS

| | | |
|---|---|---|
| KR | 10-2009-0092652 | 9/2009 |
| WO | 9112472 A1 | 8/1991 |
| WO | 2008127228 A1 | 10/2008 |

OTHER PUBLICATIONS

Korean Patent Abstracts, Publication No. 10-2009-0092652, Published Sep. 1, 2009, KIPO, Republic of Korea.

\* cited by examiner

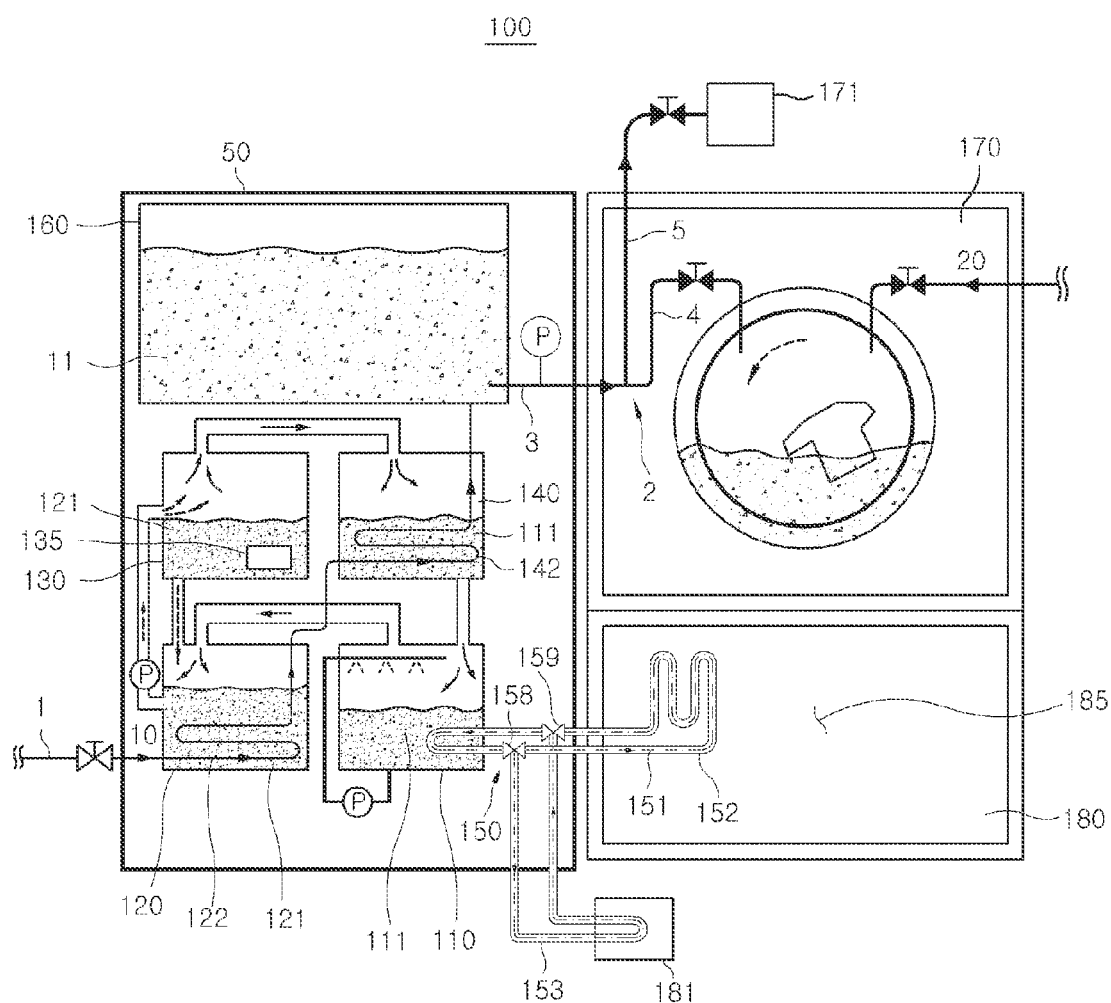

ABSORPTION REFRIGERATION SYSTEM

CROSS-REFERENCE TO RELATED APPLICATION

This application is based on and claims priority to Korean Patent Application No. 10-2013-0163908, filed on Dec. 26, 2013, the disclosure of which is incorporated herein in its entirety by reference.

TECHNICAL FIELD

Embodiments according to the present disclosure relate to an absorption refrigeration system, more particularly, to an absorption refrigeration system that is capable of generating and storing hot water and supplying the hot water to a hot water consumption unit, and is capable of cooling a cold air consumption unit.

BACKGROUND

Unlike compressor refrigerators, absorption refrigerators do not employ a refrigeration scheme in which a refrigerant is evaporated then compressed mechanically. Instead, absorption refrigerators employ a refrigeration scheme in which a refrigerant is absorbed into an absorbent solution and then evaporated from the absorbent solution.

An absorption refrigerator may include an evaporator and a condenser, as well as an absorber, a regenerator, a heat exchanger, a pump, a heat source for heating the absorbent solution, refrigerant lines, absorbent solution lines, cooling water lines, and cold water lines.

Absorption refrigerators provide a number of advantages such as reduced noise and vibration during operation, utilization of waste heat, and reduced emission of carbon dioxide. Consequently, absorption refrigerators and energy reduction schemes using absorption refrigerators are being actively investigated.

SUMMARY

Embodiments according to the present disclosure provide an absorption refrigeration system that is capable of generating and storing hot water and supplying the hot water to a hot water consumption unit as needed.

Embodiments according to the present disclosure also provide an absorption refrigeration system that is capable of cooling a cold air consumption unit.

To this end, the absorption refrigeration system in one or more embodiments according to the present disclosure include: an evaporator configured to evaporate a first refrigerant; an absorber configured to contain an absorbent solution and absorb the evaporated first refrigerant; a regenerator configured to regenerate the absorbent solution by heating the absorbent solution from the absorber; a condenser configured to condense the first refrigerant evaporated in the regenerator; a cooler configured to circulate a second refrigerant inside the evaporator, where the second refrigerant is cooled at the evaporator by evaporation of the first refrigerant; a hot water storage tank configured to store hot water, where the hot water absorbs heat from the absorber and the condenser; one or more hot water consumption units configured to receive the hot water from the hot water storage tank; and one or more cold air consumption units configured to receive and be cooled using the cooled second refrigerant from the evaporator.

In one or more other embodiments, the absorption refrigeration system may further include: a first radiator connected to an external water supply pipe, where at least a portion of the first radiator is inside the absorber; and a second radiator coupled between the first radiator and the hot water storage tank, where at least a portion of the second radiator is positioned inside the condenser, where the cooling water flows from the water supply pipe to the first radiator to absorb heat inside the absorber, then to the first radiator to the second radiator to absorb heat inside the condenser, and then to the hot water storage tank.

In one or more other embodiments, the absorption refrigeration system may further include a hot water pipe configured to supply the hot water to the hot water consumption units, where one end of the hot water pipe is connected to the hot water storage tank and another end is connected to the hot water consumption unit(s).

A plurality of hot water consumption units may be provided, in which case the hot water pipe may include: a main pipe connected to the hot water storage tank; and a plurality of auxiliary pipes branching from the main pipe and connected to the plurality of hot water consumption units, respectively, where the hot water is supplied to the plurality of hot water consumption units.

At least one of the hot water consumption units may be a washing machine or a dishwasher.

At least one of the cold air consumption units may be a refrigerator or an air conditioner.

A portion of the cooler may be inside a storage compartment of the refrigerator.

The refrigerator may be a side dish refrigerator (e.g., a mini-fridge or a kimchi refrigerator).

A plurality of cold air consumption units may be provided, in which case the cooler may include: a main loop pipe configured to supply the cooled second refrigerant to one of the cold air consumption units; and at least one auxiliary loop pipe to supply the cooled second refrigerant to the rest of the cold water consumption units, where the at least one auxiliary loop pipe branches from the main loop pipe. In some embodiments, a portion of the second refrigerant circulates in the main loop pipe and supplies the cold air to one of the plurality of the cold air consumption units and the remainder of the second refrigerant circulates in the at least one auxiliary loop pipe and supplies the cold air to the rest of the cold air consumption units.

The evaporator, the absorber, the regenerator, the condenser, and the hot water storage tank may form an absorption refrigerator, and at least two of the absorption refrigerator, a hot water consumption unit, and a cold air consumption unit are integrated with one another.

As a result, an absorption refrigeration system that is capable of generating and storing hot water and supplying the hot water to a hot water consumption unit is provided.

Also, an absorption refrigeration system that is capable of cooling a cold air consumption unit is provided.

Also, an absorption refrigeration system that is capable of supplying hot water to one or more hot water consumption units and/or cooling one or more cold air consumption units at the same time is provided.

Also, an absorption refrigeration system that is capable of generating hot water by recycling waste heat generated in an absorption refrigerator is provided.

Also, in an embodiment or embodiments in which the hot water consumption unit is a washing machine or a dishwasher, an absorption refrigeration system that is capable of minimizing energy consumption during a washing operation, by automatically supplying the hot water stored in the hot water storage tank to the washing machine or dishwasher, is provided.

Also, in an embodiment or embodiments in which the cold air consumption unit is a refrigerator, an absorption refrigeration system that is capable of preserving food and preventing accumulation of smells from the food using a direct cooling method is provided.

Also, an absorption refrigeration system that is capable of operating a plurality of household appliances using one absorption refrigerator, thereby reducing the space normally occupied by the household appliances, is provided. For example, the cold air consumption unit may be a refrigerator (e.g., a min-fridge or kimchi refrigerator) and the hot water consumption unit may be a washing machine, and by integrating the units as described above, they can be practically employed in hotels, resorts, cruise ships, apartments, dormitories, etc.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIG. 1 shows a configuration of an absorption refrigeration system in one or more embodiments according to the present disclosure.

DETAILED DESCRIPTION

In the following detailed description, reference is made to the accompanying drawings, which form a part hereof. The illustrative embodiments described in the detailed description, drawings, and claims are not meant to be limiting. Other embodiments may be utilized, and other changes may be made, without departing from the spirit or scope of the subject matter presented here.

Hereinafter, one or more exemplary embodiments according to the present disclosure will be described in detail with reference to the accompanying drawings. Various configurations of the present disclosure, and operations and/or effects according to the configurations of the present disclosure, will be clearly understood by the detailed description below.

It should be noted that the drawings are schematically provided and not necessarily to scale. The relative dimensions and ratios of the parts illustrated in the drawings may be exaggerated or reduced in size for clarity and convenience in the drawings, and the dimensions are only examples without limitation. In the following description, the same elements will be designated by the same reference numerals, and a detailed explanation of known related constitutions may be omitted so as to avoid unnecessarily obscuring the subject matter of the present disclosure.

Exemplary embodiments according to the present disclosure show ideal examples of the present disclosure. Accordingly, the exemplary embodiments shown in the drawings are expected to be changed in various ways. Therefore, the exemplary embodiments are not limited to specific configurations in the drawings, and may be changed to have various shapes and/or arrangements by manufacturing.

FIG. 1 shows an absorption refrigeration system 100 in one or more embodiments according to the present disclosure.

In the example embodiment(s) of FIG. 1, the absorption refrigeration system 100 includes an evaporator 110, an absorber 120, a regenerator 130, a condenser 140, a cooler 150, a hot water storage tank 160, a hot water consumption unit 170, and a cold air consumption unit 180.

The evaporator 100 contains a first refrigerant 111. In one or more embodiments, the first refrigerant 111 is water. In embodiments in which the first refrigerant 111 is water, the first refrigerant 111 can start to evaporate at 100 degrees Celsius (° C.) at an atmospheric pressure of 760 mm Hg, but can also start to evaporate at a lower temperature if it is at a lower pressure; for example, it can evaporate at 5 degrees Celsius at 6 mm Hg. Accordingly, the evaporator 110 can be maintained at a lower pressure in order to reduce the evaporation temperature of the first refrigerant 111.

In the example embodiment(s) of FIG. 1, a cooler 150 containing a second refrigerant 151 is provided inside the evaporator 110. The cooler 150 may be a loop pipe in which the second refrigerant 151 can circulate, and the second refrigerant 151 can flow to the cold air consumption unit 180 after exchanging heat with the first refrigerant 111 inside the evaporator 110.

The first refrigerant 111 contained in the evaporator 110 can start to evaporate when its evaporation temperature is reached. As the first refrigerant 111 evaporates in the evaporator 110, the first refrigerant 111 can absorb ambient heat including heat from the portion of the main loop pipe 152 that is inside the evaporator 110; thus, heat may be removed from the second refrigerant 151 in the cooler 150, and thus the temperature of the second refrigerant 151 may be lowered. For example, the second refrigerant 151 may be cooled to approximately 6° C. The cooled second refrigerant 151 can be supplied to the cold air consumption unit 180.

As the evaporator 110 fills with vapor from evaporation of the first refrigerant 111, the internal pressure of the evaporator 110 may increase, and as a result the boiling point of the first refrigerant 111 may increase. Accordingly, the temperature of the second refrigerant 151, after being cooled as described above, also may increase. In the example embodiment(s) of FIG. 1, the refrigeration system 100 includes an absorber 120. As described below, the absorber 120 helps cool the second refrigerant 151 to a desired temperature before it is supplied to the cold air consumption unit 180.

The absorber 120 can remove vapor due to evaporation of the first refrigerant 111 from the evaporator 110, thereby preventing the internal pressure of the evaporator 110 from increasing to a point where it might significantly affect the temperature of the second refrigerant 151.

More specifically, in the example embodiment(s) of FIG. 1, the absorber 120 is connected to the evaporator 110 so that the evaporated first refrigerant 111 can flow to the absorber 120. In some embodiments, the first refrigerant 111 is water, as previously mentioned, in which case the evaporated first refrigerant includes water vapor. An absorbent solution 121 containing an absorbent that can absorb moisture is contained in the absorber 120. In an embodiment, the absorbent is lithium bromide (LiBr), and the absorbent solution 121 is an aqueous solution of lithium bromide. However, as is known in the art, a wide variety of other salts can be used in water-based absorption refrigeration/cooling systems. The absorbent solution 121 can absorb the evaporated first refrigerant 111 received from the evaporator 110. Accordingly, the evaporated first refrigerant 111 can be removed from the evaporator 110, to control (e.g., reduce) the pressure inside the evaporator 110.

Cooling of the second refrigerant 151 at the evaporator 110 can continue until the absorbent solution 121 inside the absorber 120 is saturated, e.g., it is at the point where no more of the evaporated first refrigerant 111 can be absorbed by the absorbent solution 121.

Meanwhile, as the evaporated first refrigerant 111 is absorbed by the absorbent solution 121, absorption heat may be generated in the absorber 120. As the temperature of the absorbent solution 121 rises, the absorbent solution's ability to absorb evaporated first refrigerant 111 may decrease. To address that, cooling water 10 from an outside source can be supplied to the absorber 120, thereby preventing the temperature of the absorbent solution 121 from rising to a point where its ability to absorb evaporated first refrigerant 111 is significantly affected. The cooling water 10 can be supplied to the absorber 120 from an external water supply pipe 1.

The cooling water 10 supplied from the water supply pipe 1 can pass through the absorber 120 through a first radiator 122 that is inside the absorber 120. The first radiator 122 may comprise a pipe through which the cooling water 10 flows. The cooling water 10 inside the first radiator 122 can absorb heat from the absorber 120.

When the absorbent solution 121 in the absorber 120 absorbs more than a certain amount of evaporated first refrigerant 111 from the evaporator 110, the absorbent solution 121 may become saturated (e.g., no more of the evaporated first refrigerant 111 can be absorbed by the absorbent solution 121). To prevent this, the first refrigerant 111 that has been absorbed by the absorbent solution 121 is separated from the absorbent solution 121. In an embodiment in which the first refrigerant 111 is water and the absorbent solution 121 is an aqueous solution of lithium bromide, separating the first refrigerant 111 from the absorbent solution 121 means removing water from the aqueous solution of lithium bromide.

To separate the first refrigerant 111 from the absorbent solution 121 (e.g., to separate the water from the aqueous solution of lithium bromide), the absorbent solution 121 may be heated. When the absorbent solution 121 is heated directly in the absorber 120, vapor due to evaporation of the first refrigerant 111 from the absorbent solution 121 can be returned to the evaporator 110 via a connection between the evaporator 110 and the absorber 120. The absorbent solution 121 can then be transferred from the absorber 120 to the regenerator 130 using a mechanism such as a pump. The absorbent solution 121 can be heated in the regenerator 130 using a heater 135.

As the absorbent solution 121 is heated in the generator 130, vapor due to evaporation of the first refrigerant 111 from the absorbent solution 121 can flow to the condenser 140, where the vapor is cooled and condensed and therefore liquefied. Cooling water 10 can be used to cool and condense the evaporated first refrigerant 111 in the condenser 140. The cooling water 10 can be supplied to the absorber 120 from outside the refrigeration system 100 via the water supply line 1. After the cooling water 10 is supplied to the absorber 120, the cooling water 10 can flow through a first radiator 122 inside the absorber 120 and through a second radiator 142 inside the condenser 140. The second radiator 142, similar to the first radiator 122, may be a pipe member through which the cooling water 10 flows. When the cooling water 10 flows through the second radiator 142, the cooling water may absorb heat from the vaporized first refrigerant 111.

The first refrigerant 111 is cooled by the cooling water 10 flowing through the second radiator 142 and condensed to a liquid state, and the condensed first refrigerant 111 can be returned to the evaporator 110. After the evaporated first refrigerant 111 has been removed from the absorbent solution 121 in the regenerator 130, the absorbent solution 121 is no longer saturated (e.g., the concentration of aqueous solution of lithium bromide in the absorbent solution is higher) and can be returned to the absorber 120 to absorb evaporation from the first refrigerant 111 as described above.

As previously described herein, the temperature of the cooling water 10 supplied via the external water supply pipe 1 may increase as a result of absorbing heat when the cooling water passes through the absorber 120 (more specifically, through the first radiator 122 inside the absorber 120) and the condenser 140 (more specifically, through the second radiator 142 inside the condenser 140). The hotter cooling water 10 (hot water 11) can be stored in the hot water storage tank 160. The water supply pipe 1, the first radiator 122, the second radiator 142, and the hot water storage tank 160 may be connected in series.

The capacity of the hot water storage tank 160 and/or the maximum temperature of the hot water 11 stored in the tank depends on the cooling capacity of the absorption refrigeration system 100, the target maximum temperature of the hot water, the target end use of the hot water 11, etc. A typical refrigeration cycle, even for smaller-sized refrigerators (e.g., having a storage space of about 0.25 m$^3$), may produce about 100-200 kcal/hour of waste heat. In general, 100 kcal of heat is sufficient to heat four liters of water from 25° C. to about 50° C.

The hot water 11 stored in the hot water storage tank 160 can be supplied to the hot water consumption unit 170 via a hot water pipe 2 (also referred to herein as the "second pipe"). One end of the hot water pipe 2 may be connected to the hot water storage tank 160 and the other end of the hot water pipe 2 may be connected to the hot water consumption unit 170. The hot water pipe 2 may be equipped with a pump, and thus the hot water 11 stored in the hot water storage tank 160 can be readily supplied to the hot water consumption unit 170.

Further, the hot water storage tank 160 may be equipped with a water level control device (not shown). A water level control device can be implemented using various water level control means such as a ball tap type, electrode type, wireless control type, or the like. When hot water 11 is in the hot water storage tank 160, the water level control device can notify a control unit (not shown) or an administrator. The control unit or the administrator can discharge a portion of the hot water 11 stored in the hot water storage tank 160, using a pump on the hot water pipe 2. The discharged hot water 11 can be supplied to another hot water storage tank (e.g., a boiler) and subsequently used for heating, washing, showering, etc.

For example, the hot water consumption unit 170 may be a washing machine. Accordingly, the hot water 11 can be supplied to the washing machine 170. The washing machine 170 can use the hot water 11 supplied from the hot water storage tank 160 for washing articles such as clothes, and also can use the cold water 20 supplied from a general water supply pipe for rinsing the washed articles.

The hot water 11 generated in the absorption refrigeration system 100 can be stored in the hot water storage tank 160. The hot water 11 may be supplied to a plurality of different hot water consumption units. The hot water 11 may be used for showering and other applications such as heating, washing (washing clothes [e.g., in an automated washing machine] or dishes [e.g., in an automated dishwasher]), etc.

To achieve this, the hot water pipe 2 may include a main pipe 3 and one or more auxiliary pipes. In the example of FIG. 1, two hot water consumption units 170 and 171 are illustrated, and accordingly two auxiliary pipes 4 and 5 are also shown in this example. The main pipe 3 may be connected directly to the hot water storage tank 160. The hot water 11 stored in the hot water storage tank 160 can be discharged via the main pipe 3. The auxiliary pipes 4 and 5 may branch off from the main pipe 3 and may be connected to the plurality of the hot water consumption units 170 and 171, respectively. Accordingly, the hot water 11 first can flow through the main pipe 3 and then divided between the auxiliary pipes 4 and 5. A portion of the hot water can thus be supplied to each of the hot water consumption units 170 and 171, respectively.

As previously described, the second refrigerant 151 can be cooled by evaporation of the first refrigerant 111 in the evaporator 110. In other words, the cooler 150 may be a loop pipe, with one side of the loop pipe positioned inside the evaporator 110. While the second refrigerant 151 circulates through the cooler 150, specifically through the portion of the cooler 150 that is inside the evaporator 110, the second refrigerant 151 may lose thermal energy due to evaporation of the first refrigerant 111, thereby being cooled. The cooled second refrigerant 151 can be transferred to the cold air consumption unit 180 that is connected to the other side of the cooler 150, thereby cooling the cold air consumption unit 180.

In one or more embodiments, the cold air consumption unit 180 is a refrigerator. As shown in FIG. 1, the other side of the cooler 150 may be positioned in a storage compartment 185 of the refrigerator 180, and the inside of the storage compartment 185 can be cooled by the second refrigerant 151 circulating through the cooler 150. The second refrigerant 151, after cooling the storage compartment 185 and being warmed as a result, can be transferred to the evaporator 110 and cooled again.

In the example of FIG. 1, another side or portion of the cooler 150 is inside the storage compartment 185 of the refrigerator 180. The refrigerator 180 may be a type that uses a direct cooling method. In that case, food stored in the storage compartment 185 may be preserved. Further, the internal temperature of the storage compartment 185 is not expected to vary significantly due to opening and closing of the compartment's door. The refrigerator 180 may also be used as a "side dish" refrigerator; as used herein, the term "side dish refrigerator" refers to a smaller-sized refrigerator, sometimes known as a mini-fridge or kimchi refrigerator, on the order of 0.25 cubic meters in volume. As such, the refrigerator 180 can advantageously prevent the accumulation of smell and maintain the freshness of the side dishes.

In the above example, multiple hot water consumption units 170 and 171 are illustrated. Likewise, multiple cold air consumption units 180 and 181 may be provided. All of the cold air consumption units 180 and 181 may be refrigerators or, alternatively, they may be different types of cooling devices, e.g., one of the cold air consumption units may be a refrigerator and another may be an air conditioner.

In order to cool each of the cold air consumption units (e.g., the units 180 and 181), the cooler 150 may include a main loop pipe 152 (also referred to herein as the "first pipe") and an auxiliary loop pipe 153. The main loop pipe 152 can be used to supply cooled second refrigerant 151 to one of the cold air consumption units (e.g., the unit 180), in which case one side of the main loop pipe 152 may be positioned inside the evaporator 110 and the other side of the main loop pipe 151 may be positioned in the cold air consumption unit 180. The auxiliary loop pipe 153 can be used to supply cooled second refrigerant 151 to the rest of the cold air consumption units (e.g., the unit 181), in which case the auxiliary loop pipe 153 may branch off of the main loop pipe 152 and then return to the main loop pipe 152. The second refrigerant 151 flowing through the main loop pipe 152 can be cooled in the evaporator 110. A portion of the cooled second refrigerant 151 can circulate through the main loop pipe 152 to cool one of the cold air consumption units (e.g., the unit 180). The rest of the cooled second refrigerant 151 can circulate through the auxiliary loop pipe 153 to cool the rest of the cold air consumption units (e.g., the unit 181). A first flow path switching valve 158 may be provided at the point where the auxiliary loop pipe 153 branches off from the main loop pipe 152, and a second flow path switching valve 159 may be provided at the point where the auxiliary loop pipe 153 joins the main loop pipe 152. The first flow path switching valve 158 and the second flow path switching valve 159 may each be a 3-way valve. Accordingly, depending on how it is needed, the second refrigerant 151 can circulate through both the main loop pipe 152 and the auxiliary loop pipe 153, or alternatively, it can circulate through either the main loop pipe 152 or the auxiliary loop pipe 153.

Meanwhile, the evaporator 110, the absorber 120, the regenerator 130, the condenser 140, and the hot water storage tank 160 may constitute components of an absorption refrigerator 50, which may also include the cooler 150. Such an absorption refrigerator 50 may be integrated with the hot water consumption unit 170. Further, the absorption refrigerator 50 may be integrated with the cold air consumption unit 180. Furthermore, the absorption refrigerator 50, the hot water consumption unit 170, and the cold air consumption unit 180 may be integrated with each other. These types of integrated configurations reduce the space required for the various systems and permit those systems to readily interact with each other. For example, if the hot water consumption unit 170 is a washing machine and the cold air consumption unit 180 is a refrigerator, then the washing machine 170 and the refrigerator 180 may be integrated, thereby reducing the space needed if the washing machine and refrigerator were to be separately implemented, permitting available space (e.g., in an apartment or hotel room) to be more efficiently utilized.

If the hot water storage tank 160 is not filled with hot water 11—if the water level control device detects that there is not enough hot water 11 in the hot water storage tank 160—then the control unit or the administrator can start the absorption refrigerator 50. If, for example, the cold air consumption unit 180 is a refrigerator and is able to sufficiently cool the compartment 185 on its own, then the absorption refrigerator 50 may be idle, in which case the cooling water 10 is not being provided and hot water 11 is not being generated. If there is a shortage of hot water 11, the control unit or the administrator can start the absorption refrigerator 50, thereby supplying cooling water 10 to generate hot water 11.

Hereinafter, operation of an absorption refrigeration system having the above configuration will be described.

In the embodiment(s) of FIG. 1, the second refrigerant 151 circulating inside the cooler 150, after being cooled in the evaporator 110, can be supplied to the cold air consumption unit 180, and the cooling water 10, after passing through the condenser 140, may become heated (hot water 11) and can be supplied to the hot water storage tank 160. The hot water 11 stored in the hot water storage tank 160 may be supplied to at least one of the hot water consumption units 170 and 171.

To achieve this, the first radiator 122 passing inside the absorber 120 and the second radiator 142 passing inside the condenser 140 can be connected with each other, and the cooling water 10 supplied from an external source can flow through the first radiator 122 and the second radiator 142. The cooling water 10 flowing through the radiator 122 can prevent the temperature of the absorbent solution 121 inside the absorber 120 from rising. As a result, the absorbent solution 121 is able to absorb vapor from evaporation of the first refrigerant 111. Subsequently, the cooling water 10, while flowing through the second radiator 142, can condense and liquefy the evaporated first refrigerant 111 supplied to the condenser 140 from the regenerator 130. Consequently, the cooling water 10 can absorb heat from the ambient while flowing through the first radiator 122 and the second radiator 142, thereby becoming hot water 11. The hot water 11 thus generated can be stored in the hot water storage tank 160, and then can be supplied to at least one of the hot water consumption units 170 and 171.

Meanwhile, when the second refrigerant 151 circulating inside the cooler passes through the evaporator 110, the second refrigerant 151 can be cooled by the first refrigerant 111. The heat thus generated can be used to evaporate the first refrigerant 111. The second refrigerant 151, after being cooled by the first refrigerant 111 inside the evaporator 110, can be supplied to the cold air consumption unit 180. The second refrigerant 151 can be supplied to at least one of the cold air consumption units 180 and 181.

As described above, the absorption refrigeration system 100 in one or more embodiments according to the present invention is capable of cooling one or more cold air consumption units (e.g., the units 180 and 181), and at the same time is capable of supplying hot water 11 to one or more hot water consumption units (e.g., the units 170 and 171). Therefore, the absorption refrigeration system 100 can be used for different applications (e.g., for refrigeration, heating, washing, etc.) in different environments (e.g., in a house, apartment, hotel, dormitory, etc.).

Although exemplary embodiments according to the present disclosure are described above with reference to the accompanying drawing, those skilled in the art would understand that the present disclosure may be implemented in various ways without changing the necessary features or the spirit of the present disclosure.

Therefore, it should be understood that the exemplary embodiments described above are not limiting, but only are examples in all respects. The scope of the present disclosure is expressed by claims described below, not the detailed description, and it should be construed that all of changes and modifications achieved from the meanings and scope of claims and equivalent concepts are included in the scope of the present disclosure.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A system, comprising:
    an evaporator configured to evaporate a first refrigerant;
    an absorber configured to contain an absorbent solution and absorb the evaporated first refrigerant;
    a regenerator configured to regenerate the absorbent solution by heating the absorbent solution supplied from the absorber;
    a condenser configured to condense the first refrigerant evaporated in the regenerator;
    a cooler configured to circulate a second refrigerant inside the evaporator, wherein the second refrigerant is cooled in the evaporator by evaporation of the first refrigerant;
    a hot water storage tank configured to store hot water that is heated using heat from the absorber and the condenser;
    one or more hot water consumption units configured to receive the hot water from the hot water storage tank; and
    one or more cold air consumption units configured to receive the cooled second refrigerant from the evaporator via the cooler.

2. The system of claim 1, further comprising:
    a first radiator coupled to an external water supply pipe that supplies cooling water, wherein at least a portion of the first radiator is inside the absorber; and
    a second radiator coupled between the first radiator and the hot water storage tank, wherein at least a portion of the second radiator is inside the condenser,
    wherein the cooling water flows from the water supply pipe to the first radiator to absorb heat inside the absorber, then from the first radiator to the second radiator to absorb heat inside the condenser, and then to the hot water storage tank.

3. The system of claim 1, further comprising:
    a hot water pipe coupled between the hot water storage tank and the one or more hot water consumption units and configured to supply the hot water to the one or more hot water consumption units.

4. The system of claim 3, wherein the one or more hot water consumption units comprise at least a first hot water consumption unit and a second hot water consumption unit, and the hot water pipe further comprises:
    a main pipe coupled to the hot water storage tank; and
    a plurality of auxiliary pipes coupled to the main pipe and coupled to the first and second hot water consumption units, respectively,
    wherein the hot water is supplied to the first and second hot water consumption units via the main pipe and the plurality of auxiliary pipes.

5. The system of claim 1, wherein at least one of the hot water consumption units comprises a washing machine.

6. The system of claim 1, wherein at least one of the cold air consumption units comprises a refrigerator.

7. The system of claim 6, wherein a portion of the cooler is inside a storage compartment of the refrigerator.

8. The system of claim 7, wherein the refrigerator is a mini-fridge or a side dish refrigerator.

9. The system of claim 6, wherein at least one of the hot water consumption units comprises a washing machine.

10. The system of claim 1, wherein the one or more cold air consumption units comprise at least a first cold air consumption unit and a second cold air consumption unit, wherein the cooler further comprises:
    a main loop pipe configured to supply the cooled second refrigerant to the first cold air consumption unit; and
    at least one auxiliary loop pipe coupled to the main loop pipe and configured to supply the cooled second refrigerant to the second cold water consumption unit.

11. The system of claim 1, wherein the evaporator, the absorber, the regenerator, the condenser, and the hot water storage tank comprise an absorption refrigerator, and at least two of the absorption refrigerator, a hot water consumption unit, and a cold air consumption unit are integrated with one another.

12. An apparatus, comprising:
a first unit selected from the group consisting of a refrigerator and an air conditioner;
a second unit selected from the group consisting of a washing machine, a dishwasher, a shower, and a heater; and
an absorption refrigerator coupled to the first unit via a first pipe and coupled to the second unit via a second pipe, the system configured to both supply a refrigerant to the first unit and hot water to the second unit, the absorption refrigerator comprising:
    an evaporator configured to evaporate a first refrigerant;
    an absorber configured to contain an absorbent solution and absorb the evaporated first refrigerant;
    a regenerator configured to regenerate the absorbent solution by heating the absorbent solution supplied from the absorber;
    a condenser configured to condense the first refrigerant evaporated in the regenerator;
    a cooler configured to circulate a second refrigerant inside the evaporator, the second refrigerant cooled in the evaporator by evaporation of the first refrigerant, the second refrigerant supplied to the first unit via the first pipe; and
    a hot water storage tank configured to store the hot water, heated using heat from the absorber and the condenser and supplied to the second unit via the second pipe.

13. A method, comprising:
evaporating a first refrigerant in an evaporator;
absorbing the evaporated first refrigerant using an absorbent solution in an absorber;
regenerating the absorbent solution by heating the absorbent solution in a regenerator;
condensing the first refrigerant evaporated in the regenerator in a condenser;
circulating, with a cooler, a second refrigerant inside the evaporator;
cooling the second refrigerant in the evaporator by evaporating the first refrigerant;
storing hot water that is heated using heat from the absorber and the condenser in a hot water storage tank;
supplying the hot water from the hot water storage tank to one or more hot water consumption units; and
supplying the cooled second refrigerant from the evaporator to one or more cold air consumption units via the cooler.

14. The method of claim 13, further comprising:
circulating cooling water from an external water supply pipe to a first radiator to absorb heat inside the absorber, then from the first radiator to a second radiator to absorb heat inside the condenser, and then to the hot water storage tank.

15. The method of claim 13, wherein the one or more hot water consumption units comprise at least a first hot water consumption unit and a second hot water consumption unit and the method further comprises:
supplying the hot water to the one or more hot water consumption units via a hot water pipe coupled between the hot water storage tank and the one or more hot water consumption units, wherein the hot water pipe comprises: a main pipe coupled to the hot water storage tank; and a plurality of auxiliary pipes coupled to the main pipe and coupled to the first and second hot water consumption units, respectively, wherein the hot water is supplied to the first and second hot water consumption units via the main pipe and the plurality of auxiliary pipes.

* * * * *